United States Patent Office 2,940,829
Patented June 14, 1960

2,940,829

IMPROVEMENT RELATING TO THE PURIFICATION OF SOLUBLE SILICATES

Norman A. Hurt, Lymm, and Henry Mortimore, Stockton Heath, England, assignors to Philadelphia Quartz Company, Philadelphia, Pa., a corporation of Pennsylvania No Drawing. Filed Dec. 13, 1957, Ser. No. 702,529

Claims priority, application Great Britain Dec. 13, 1956

14 Claims. (Cl. 23—110)

This invention relates to soluble silicates and has particular reference to the production of soluble silicates having a low content of iron.

Soluble silicates are normally made by the fusion of sand or other forms of silica with alkalis or suitable salts of alkali metals, or by solution of silica in concentrated solutions of alkali hydroxides. While most of such impurities as the raw materials may contain are usually removed by a settling process, a significant proportion of any iron contained in them will normally still be present in the final product. The presence of an appreciable amount of iron in soluble silicates is, however, a disadvantage in many of the technical uses of these materials, particularly in the bleaching of textiles and in the manufacture of detergents and fine chemicals, for which purposes the iron content should be as low as possible. For this reason it has generally been the practice in the manufacture of silicates destined for such uses to employ only sands or other forms of silica having a low iron-content. Such materials, however, are frequently less readily obtainable than those having a relatively high iron-content and a process by which soluble silicates of low iron-content can be made from these more readily obtainable materials, therefore, offers considerable advantages.

It is an object of this invention to provide a process by which the iron content of soluble silicates containing relatively large amounts of iron may be reduced and hence to enable low-quality silica of relatively high iron-content to be used in the manufacture of high-quality soluble silicates.

It has now been found that the iron content of soluble silicates can be reduced by treating the silicates in aqueous solution with a small proportion of a substance which will precipitate an insoluble silicate, the iron present being apparently adsorbed on to the nascent precipitate.

The invention provides, therefore, a process of reducing the iron content of an iron-containing soluble silicate by treating the soluble silicate in aqueous solution with a small proportion of a substance which will precipitate an insoluble silicate and filtering the treated solution.

The silicates to which the process of the invention may be applied include all alkali-metal silicates and especially the usual silicates of sodium and potassium. The ratio of silica to alkali-metal oxide in these materials may have any desired value but the process will usually be applied to sodium or potassium silicates having a $SiO_2:Na_2O$ (or $K_2O$) ratio of from 2:1 to about 3.9:1. These silicates may initially have an iron content of 500 parts per million or more dependent mainly on the quality of the silica used in their production.

The strength of the silicate solution is not critical. However, to reduce the bulk of material to be handled the solution should be as concentrated as possible, given that it must possess sufficient mobility to allow it to be handled, pumped, stirred and filtered without undue expense of power and to allow the sediment formed during the treatment to settle out in reasonable time. In general it has been found that sodium silicate solutions of specific gravity in the region of 1.25 (silicate solids content about 25 to 30% according to $SiO_2:Na_2O$ or $K_2O$ ratio) are most satisfactory.

Compounds which may be used for the treatment of soluble silicates according to the invention include, for instance soluble salts of calcium, strontium, barium and magnesium, and ammonium titanate and ammonium molybdate. It is also possible to use compounds having only a limited solubility in water provided that this exceeds the solubility of the corresponding silicate. Thus, stannic oxide and the oxides and hydroxides of the alkaline-earth metals may be used, and their use may be advantageous where it is desired to avoid the introdution of foreign anions into the solution. As little as 0.005% of the precipitating agent, by weight of the silicate solution, may give a useful effect and generally satisfactory results have been obtained using from 0.01% to 0.1%. The upper limit is not critical but no more precipitating agent will be used than is necessary to give the desired result.

It has been found that the removal of iron from soluble silicate solutions is more nearly complete when the iron is present in an oxidised state. It is, therefore, frequently advantageous to treat the soluble silicate solutions with oxidising agents before or during the precipitation process. Any oxidising agents capable of converting iron from a lower to a higher valency state may be used. Even boiling the solution in air may have some effect but it is preferred to add oxidising agents such as, for instance, the peroxides and the hypochlorites. Where the precipitant is an oxide or hydroxide, the use of a peroxide has the advantage of maintaining the freedom of the solution from foreign anions. Suitable amounts range from about 0.001% to 0.01%, by weight of the solution, of hydrogen peroxide or equivalent amounts of other oxidising agents, depending upon the state and amount of the iron contained in the solution, but higher and lower amounts can usefully be used.

It is possible and frequently most convenient to use one substance as both oxidising and precipitating agent. Such substances are calcium hypochlorite (or bleaching powder) and the peroxides of the alkaline-earth metals and of magnesium. The peroxides are preferred since they, again, have the advantage of not introducing foreign anions into the solution.

Thus, in a preferred form, the invention provides a process of reducing the iron content of an iron-containing soluble silicate by treating the silicate in aqueous solution with a small amount of calcium, strontium, barium, or magnesium peroxide, and filtering the treated solution.

The peroxide to be used may be any grade of calcium, strontium, barium, or magnesium peroxide; for instance, a commercial calcium peroxide containing 55 to 57% of $CaO_2$, or a commercial magnesium peroxide containing about 25% of $MgO_2$, or their mixtures. As little as 0.005% of the pure peroxide by weight of the silicate solution may give a useful effect but normally not less than 0.01% will be used. The upper limit is not critical but no more will be used than is necessary to give the desired reduction in iron content. For silicate solutions containing not more than about 500 parts of iron per million parts of silicate solids, 0.05% of the pure peroxide will usually suffice to reduce the iron content to a satisfactory figure (for example, under 100 parts per million). In general, using peroxides of the usual commercial purity, 0.01% to 0.1% has been found satisfactory.

The process may be carried out by adding the precipitating agent to the silicate solution with stirring, heating the mixture to the desired reaction temperature for a time sufficient for the reaction to proceed to a satisfactory degree, cooling and filtering.

The precipitating agent is conveniently added in the form of a solution or slurry in water. The temperature at which the reaction is carried out is not critical but the higher temperatures give shorter reaction times and are preferred. In general a temperature of not less than 90° C., preferably not less than 100° C., should be used. It is desirable to work at higher temperatures and, therefore, at super-atmospheric pressures, preferably at a temperature such that the vapour pressure of the solution is from about 2.0 to 2.2 kg./cm.$^2$. Under such conditions the reaction is generally complete or has proceeded to a satisfactory degree in about 3 to 4 hours. After the reaction, the mixture is cooled, or allowed to cool, and is preferably allowed to stand some time (generally, from 3 to 12 hours, but considerably longer times may be advantageous in certain cases) in order to allow settling and to facilitate the subsequent filtration. If desired the solution may be concentrated or diluted before settling or before filtration. Any conventional form of filtration may be used, as, for instance, a plate-and-frame filter press, and, if desired a filter-aid, e.g. a diatomaceous earth, may be added to assist the filtration. In order to obtain particularly low iron-contents the whole process may be repeated. The process of the invention may be combined with known purification processes, for example treatment with an adsorbent such as activated carbon. The final solutions may be used as such or may be concentrated by evaporation or treated in any way in which soluble silicate solutions are normally treated.

The following examples illustrate the invention:

Example 1

300 g. of solution of sodium silicate ($SiO_2$:$Na_2O$ ratio of 3.30:1) having a specific gravity of 1.265 and an iron content of 100 p.p.m. of solution, were stirred vigorously at a temperature of 50/55° C. in a beaker while 0.1%, based on the weight of solution being treated, of calcium chloride were added. The contents of the beaker were then transferred to a long glass settling tube of 3.8 cm. internal diameter and 61 cm. length. The treated silicate liquor in the settling tube was then allowed to settle t a temperature of 90° C. After settling for 53 hours the silicate solution was allowed to cool and filtered. The filtered solution was found to have had its iron content reduced to 28 p.p.m.

Example 2

The procedure of Example 1 was repeated on a second sample of the same initial sodium silicate solution with the modifications that 0.1% of ammonium titanate, by weight of the solution being treated, was used in place of calcium chloride and the settling time was increased to 141 hrs. The final filtered solution had an iron content of 12 p.p.m.

Example 3

The procedure of Example 1 was repeated on a third sample of the same initial sodium silicate solution with the modifications that 0.1% of calcium oxide, by weight of the solution being treated, was used in place of calcium chloride and the settling time was reduced to 16 hrs. The final filtered solution had an iron content of 7 p.p.m.

Example 4

321 kg. of a settled solution of sodium silicate ($SiO_2$:$Na_2O$ ratio 2.0:1) having a specific gravity of 1.23 and an iron content of 55 parts per million parts of solution were stirred vigorously in a suitable pressure vessel while 320 g. of commercial magnesium peroxide of 25% $MgO_2$-content were added in the form of a slurry with about 3200 g. of water. The vessel was then sealed and heated until the internal pressure amounted to 2.0–2.2 kg./cm.$^2$ and was maintained at this temperature, with stirring, for 3 hours after which it was transferred to a settling vessel and allowed to cool and settle during 6 hours. The mixture was then filtered. The filtered solution was unchanged in $SiO_2$:$Na_2O$ ratio and in specific gravity and had an iron content of 6 parts per million parts of solution.

Example 5

9900 kg. of a settled solution of sodium silicate ($SiO_2$:$Na_2O$ ratio 3.30:1) having a specific gravity of 1.265 and an iron content of 96 parts per million parts of solution were stirred vigorously in a suitable pressure vessel while 9.9 kg. of commercial calcium peroxide of 55 to 57% $CaO_2$-content were added in the form of a slurry with about 99 kg. of water. After a further period of stirring to ensure complete mixing, the vessel was sealed and heated, the temperature, pressure and time of heating being as in Example 4. When the reaction was completed the mixture was blown through a pipe into a settling vessel provided with run-off pipes at three different levels and allowed to cool and settle. As cooling and settling proceeded, clear liquid was drawn off through the three run-off pipes in turn, pumped through a plate-and-frame filter press and finally, after about 12 hours settling time, the last part of the settled mixture, containing virtually all the sediment, was drawn off through the bottom of the vessel and pumped through the same filter press. The sediment removed by the filter press amounted to 270 kg. The $SiO_2$:$Na_2O$ ratio of the filtered solution was 3.27:1 and its specific gravity 1.235: it contained 23 parts of iron per million parts of solution.

Example 6

970 kg. of a settled solution of potassium silicate (molecular ratio of $SiO_2$:$K_2O$ of 3.5:1) having a specific gravity of 1.225 and an iron content of 248 parts per million were treated by the method of Example 5, using 970 g. of commercial calcium peroxide of 55 to 57% $CaO_2$-content. The final filtered potassium silicate solution contained 36 parts of iron per million parts of solution.

What is claimed is:

1. The process of purifying alkali metal silicate solutions which comprises contacting a soluble alkali metal silicate solution containing iron values with a minor proportion of an iron removing agent comprising a peroxide of an alkaline earth metal, maintaining said compounds in a reaction zone at an elevated temperature, cooling and removing precipitate formed which contains a portion of the iron values originally in the alkali metal silicate solution and recovering the purified alkali silicate solution.

2. The process according to claim 1 wherein said alkali metal silicate solution is sodium silicate.

3. The process according to claim 2 wherein said peroxide is magnesium peroxide.

4. The process according to claim 2 wherein said peroxide is calcium peroxide.

5. The process according to claim 1 wherein said elevated temperature is above 100° C.

6. The process according to claim 5 wherein said alkali metal silicate is sodium silicate.

7. The process according to claim 6 wherein said peroxide is magnesium peroxide.

8. The process according to claim 6 wherein said peroxide is calcium peroxide.

9. A process according to claim 1 wherein said alkali metal silicate has a silica to alkali metal oxide ratio of between 2:1 and 3.3:1 and the amount of said peroxide ranges between .005 wt. percent and .15 wt. percent.

10. A process according to claim 9 wherein said silicate is sodium silicate.

11. A process according to claim 9 wherein said peroxide is magnesium peroxide.

12. A process according to claim 9 wherein said peroxide is calcium peroxide.

13. The process of purifying alkali metal silicate solutions which comprises contacting a soluble alkali-metal silicate solution containing iron values with a minor proportion of an iron removing agent comprising a substance which will precipiate an insoluble silicate, and an oxidizing agent selected from the group consisting of peroxides and hypochlorites maintaining the mixture in a reaction zone at an elevated temperature, cooling and removing the precipitate formed which contains a portion of the iron values originally in the alkali-metal silicate and recovering the purified alkali silicate solution, where said iron removing agent comprises a compound of a metal other than an alkali metal having at least a slight solubility in water.

14. A process according to claim 13 in which the iron removing agent comprises a compound selected from the group consisting of the water-soluble salts and the oxides and hydroxides of the alkaline earth metals.

References Cited in the file of this patent
UNITED STATES PATENTS

| | | |
|---|---|---|
| 1,132,640 | Vail | Mar. 23, 1915 |
| 1,836,093 | Taylor | Dec. 15, 1931 |
| 2,204,113 | Allen | June 11, 1940 |
| 2,359,346 | Winding | Oct. 3, 1944 |